United States Patent
Walkley, IV et al.

[11] Patent Number: 5,677,669
[45] Date of Patent: Oct. 14, 1997

[54] AUDIO ILLUMINATOR

[75] Inventors: Arthur H. Walkley, IV, Bedford Hills, N.Y.; Edward R. Hallett, Alexandria, Va.

[73] Assignee: Applied Electro Mechanics, Inc., Alexandria, Va.

[21] Appl. No.: 689,635

[22] Filed: Aug. 13, 1996

[51] Int. Cl.$^6$ .................................................. B60Q 7/00
[52] U.S. Cl. .................. 340/473; 340/474; 340/908; 340/692; 362/271; 362/287; 362/419
[58] Field of Search ........................ 340/907, 908, 340/908.1, 473–474, 478, 825.69, 825.72, 691, 692; 40/601, 612, 455, 431, 432, 560; 362/233, 271, 272, 286, 287, 431, 428, 419

[56] References Cited

U.S. PATENT DOCUMENTS

| | | | |
|---|---|---|---|
| 3,271,735 | 9/1966 | Gosswiller | 340/473 |
| 3,579,184 | 5/1971 | Forestal | 340/470 |
| 3,757,291 | 9/1973 | Lilly | 340/908 |
| 3,789,358 | 1/1974 | Ellis | 340/473 |
| 4,104,614 | 8/1978 | Litman | 340/472 |
| 4,189,709 | 2/1980 | Gosswiller | 340/472 |
| 4,224,599 | 9/1980 | Peirish, Jr. et al. | 340/473 |
| 4,240,062 | 12/1980 | Gosswiller | 340/472 |
| 4,334,211 | 6/1982 | McConnell et al. | 340/474 |
| 4,475,226 | 10/1984 | Greenberg | 381/24 |
| 4,577,178 | 3/1986 | Hitora | 340/472 |
| 4,857,921 | 8/1989 | McBride et al. | 340/907 |
| 5,122,797 | 6/1992 | Wanasz | 340/908 |
| 5,467,071 | 11/1995 | Koenig | 340/433 |

*Primary Examiner*—Jeffery Hofsass
*Assistant Examiner*—Daniel J. Wu
*Attorney, Agent, or Firm*—Lowe, Price, LeBlanc & Becker

[57] ABSTRACT

The Audio Illuminator is an integrated system providing directed lighting and a public address type amplification and loudspeaker capability, under control from a remote location. The system includes a searchlight and one or more directional, high-power loudspeakers. An audio amplifier supplies drive signals to the loudspeakers in response to audio input signals received from the remote control. The system includes a power junction box for supplying power to the amplifier and the searchlight and carrying signals to and from the various components. The system may derive power from a small portable diesel generator. A gimbal mount supports the searchlight for two-directional movement (horizontal rotation and vertical tilt angle rotation) and supports the one or more loudspeakers for movement with the searchlight in at least one of the two directions. Drive motors provide two-dimensional automatic positioning in response to signals from the remote control unit. The speakers are highly directional, and the motion of the speakers together with the searchlight enables aiming both the sound and the light at a selected target. The remote control unit includes or provides a connection to a microphone, and the remote control supplies signals from the microphone to the audio amplifier for audio output from the loudspeakers.

20 Claims, 5 Drawing Sheets

AUDIO ILLUMINATOR

TECHNICAL FIELD

The present invention relates to a portable, integrated system providing a directed light and public address type amplified audio, with remote control of direction of the light and audio and providing remote audio input.

BACKGROUND ART

Various emergency situations require both lighting and amplified sound communication, and a number of systems have been developed over the years for providing these capabilities. Searchlights are known, and public address systems are known. However, these lighting and application systems generally are implemented as separate, independent systems. Operation of two independent systems, under emergency situations, requires extra manpower and may be ineffective.

Certain situations create special needs for lighting and audio capabilities, for law enforcement and military personnel, and existing systems do not adequately meet these needs.

Consider a border crossing as an example. An enforcement officer may need to train the searchlight on persons illegally crossing the border and command those persons to 'halt'. In such applications, the light must be bright enough to illuminate subjects at several kilometers distance from the light source, and any amplified audio must be intelligible over a substantial distance. Also, the light must be highly directional and easy to aim at or train on a distant subject.

Also, the operation of the lighting system and/or the audio system may be hazardous. If armed, the persons may shoot back. Typically, the shots are directed at the searchlight. An officer standing close by and operating the light and/or the audio system may be in the direct line of fire.

A number of systems have been developed which incorporate some limited lighting and audio capabilities. Many such systems are vehicle mounted and specifically adapted for operation from within the vehicle, for example a police cruiser or the like. However, such systems have not adequately addressed the problems highlighted by the above example.

U.S. Pat. No. 3,271,735 Gosswiller discloses a vehicle warning system having lights and a speaker mounted on a common support structure. The speaker can operate as part of a public address system or as the audio output device for a siren. The lights, however, are flashing lights and do not provide a directed light capability similar to a searchlight.

Forestal U.S. Pat. No. 3,579,184 discloses a movable platform supporting flashing lights, floodlights and the loudspeaker of a siren. A 'lazy-tong' structure supports the platform on the roof of a vehicle. In response to activation of switches within the vehicle, an electric motor drives the 'lazy-tong' support structure to extend vertically and raise the platform with the lights and loudspeaker. The Forestal system provides wide area lighting (floodlights), not directed or aimed lighting. Also, there is only one degree of freedom in the motion of the platform, up and down. The platform can not be manipulated to aim a directional searchlight and associated speaker at a target.

As shown by the above discussion, a need exists for an integrated lighting and audio system that is highly direction and controllable, and the operator should be able to control the system and input audio to the system from a safe distance.

DISCLOSURE OF THE INVENTION

An object of the invention is to provide an integrated light and audio system with directional control of the searchlight in at least two directions (two degrees of freedom) and directional control of the audio output in at least one of the directions of control of the searchlight.

Another object of the invention is to provide remote control of the integrated light and audio system, so that a person can operate the system at a safe distance from the light and audio outputs, for situations that may involve hostile or retaliatory action against the operator.

Also, the remote control should provide the input for the audio elements of the system, so that the operator can provide audio from the safe location.

A further object of the invention is to make the elements of the integrated system easy to transport and set up at different locations in the field.

To achieve these and other objects, one aspect of the present invention relates to an integrated light and speaker unit. The integrated unit includes a searchlight mounted for movement in two orthogonal directions. A first automatic drive mechanism moves the searchlight in a first one of the directions in response to a first control signal. A second automatic drive mechanism moves the searchlight in a second one of the directions in response to a second control signal. One or more loudspeakers are mounted for movement with the searchlight in at least one of the two orthogonal directions.

In the preferred embodiment, a first gimbal supports the searchlight on a bracket. A second gimbal supports the bracket on some relatively fixed support structure. The first gimbal permits tilting of the searchlight, and the second gimbal permits rotation (pan) of the bracket and searchlight. The loudspeaker may be mounted for movement with the searchlight, e.g. on the searchlight housing, but in the presently preferred embodiment, the loudspeaker is mounted on the bracket and rotates in the horizontal direction (pan) with the bracket and searchlight. Two electric motors drive the gimbals in response to the control signals.

In another aspect of the invention, the integrated light and speaker unit is combined with a remote control, in an audio-illuminator system. A user activates the remote control from a location some distance from the integrated light and speaker unit. In response to user activation, the remote control provides at least the first and second control signals. In a preferred embodiment, the remote control also includes input mechanisms (e.g. switches) to turn the searchlight on and off, to control an audio amplifier that drives the loudspeaker(s), and to control focus of the searchlight.

In another aspect of the present invention, audio input signals are supplied to the integrated light and speaker unit from the remote control. For example, the remote control may include a coupler for electrical connection to a microphone. Typically, the microphone is a handheld microphone, a lavaliere microphone, a headset microphone, or the like, easily held or worn by the operator of the system. The remote control preferably includes a connection for other audio inputs, such as from a tape recorder. The remote control supplies the audio input signal to an audio amplifier, and the audio amplifier supplies amplified audio signals to drive the one or more loudspeakers on the integrated unit.

The use of the remote control to supply both control signals and audio input signals allows the person using the audio-illuminator system to fully operate the system from some distance from the light and audio outputs of the integrated light and speaker unit. If persons targeted with the system attack, their attack will typically concentrate on the location of the perceptible light and audio outputs, not the operator's actual location.

In another aspect of the invention, the integrated light and speaker unit is easy to transport and mount on a number of different support structures. Examples discussed below include mounting on a collapsible multilegged pedestal, such as a tripod or quadropod. The integrated light and speaker unit can be temporarily mounted on one of several permanently installed posts. In another alternative embodiment, the integrated light and speaker unit can be mounted on a trailer.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
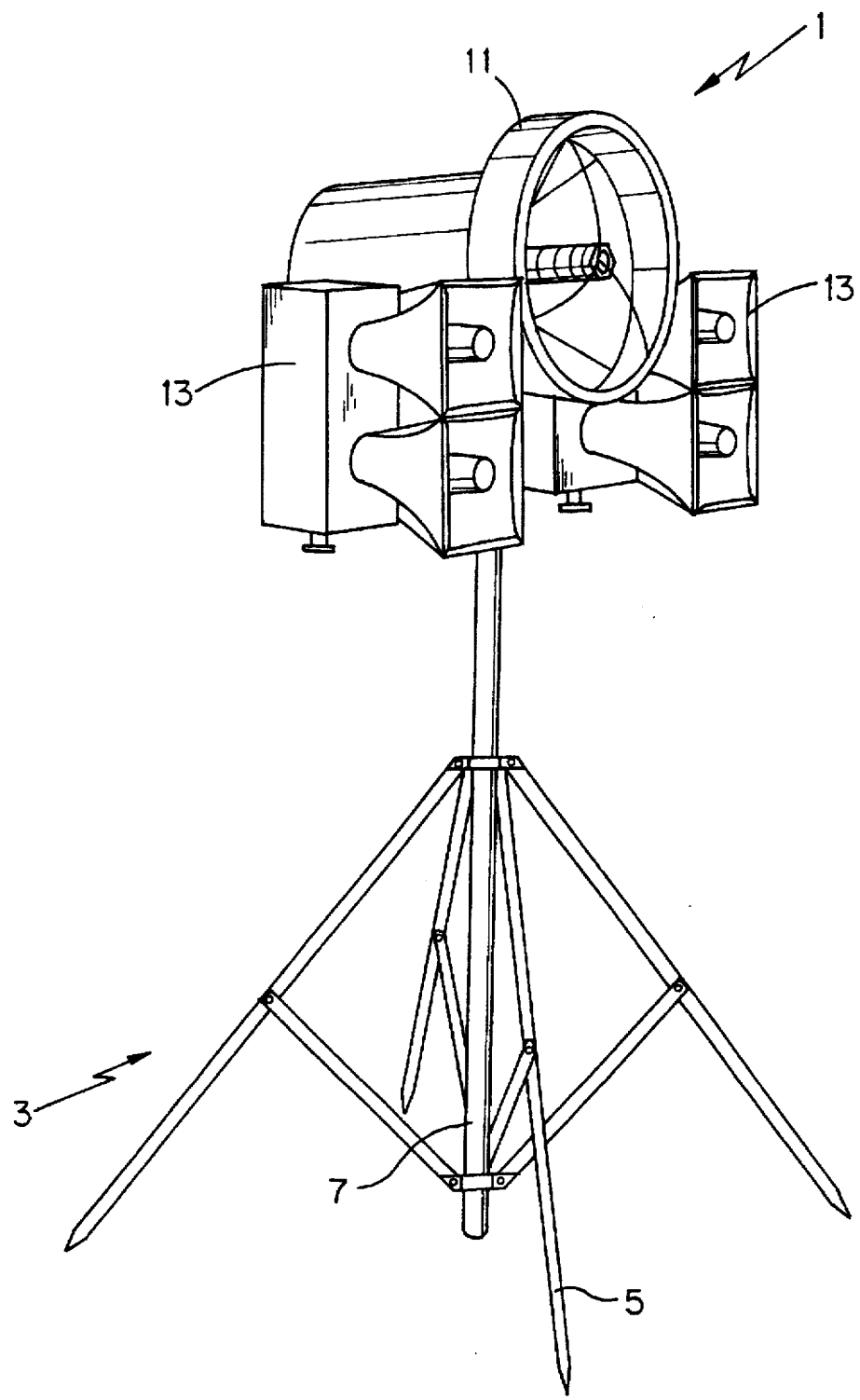
FIG. 1 is an orthogonal view of the integrated searchlight and speaker unit, in accord with the present invention, mounted on a quadropod.

FIG. 1 illustrates the directional lighting and audio output elements of the audio-illuminator system. In the illustrated embodiment, an integrated searchlight and speaker unit 1 includes a searchlight 11 and four loudspeakers 13. In this embodiment, the integrated unit 1 includes two arrays of two loudspeakers each. The arrays are mounted on opposite sides of the searchlight 11, as discussed in more detail later. The integrated searchlight and speaker unit 1 is of sufficiently small size and weight to permit one person to lift and carry the unit. As such, the unit 1 is portable.

The searchlight 11 may be a short-arc Xenon lamp with an adjustable focal element. An example of such a searchlight is the Spectrolab SX16E. The lamp produces a high-intensity white light beam of variable angular dispersion. However, the unit comes with an infrared filter (not shown) which fits over the front of the lamp, to facilitate infrared operation, for example for covert night operation.

As noted, the searchlight 11 also has a variable focusing capability. In response to an appropriate control signal, a small motor on the searchlight itself moves the searchlight reflector back and forth to change the position thereof in relation to the arc lamp.

The loudspeakers 13 preferably are light-weight high-power loudspeakers of the type disclosed in commonly assigned application Ser. No. 08/616,670 filed Mar. 20, 1996 to Grady et al., the disclosure of which is incorporated herein by reference.

In the embodiment of FIG. 1, the integrated searchlight and speaker unit 1 is movably mounted on a collapsible multi-legged pedestal support structure. The structure may be a tripod. In the illustrated embodiment the collapsible support structure is a quadropod 3. The quadropod support structure 3 includes four legs 5 and a center post 7. In the open position shown, the four legs 5 provide support and lateral stability for the center post 7. The center post may also rest on the ground, for additional strength. The integrated searchlight and speaker unit 1 includes a tube or sleeve that serves as a female coupler. The tube fits over the top of the center post of the quadropod support structure 3, which serves as a male coupler.

The integrated searchlight and speaker unit 1 is light enough to be carried to a location where needed, for example along a remote portion of a border between two countries. An operator would unfold the quadropod support structure 3, and then simply fit the tube of the integrated searchlight and speaker unit 1 over the top of the post 7, to complete the installation shown in FIG. 1.

The integrated searchlight and loudspeaker unit 1 can be mounted on any structure having a vertical post of sufficient strength and having the appropriate diameter to accept the mounting tube of the unit. For example, in applications where personnel will deploy the audio-illuminator system at the same locations over and over again, authorities may permanently install a series of posts of the same diameter as the post 7. These permanently installed posts may be at points overlooking frequently used broader crossings. On any given occasion, the enforcement personnel would simply carry the integrated searchlight and unit 1 to a desired location and fit the tube of the integrated searchlight and speaker unit 1 over the top of the permanently installed post.

Figure 2:
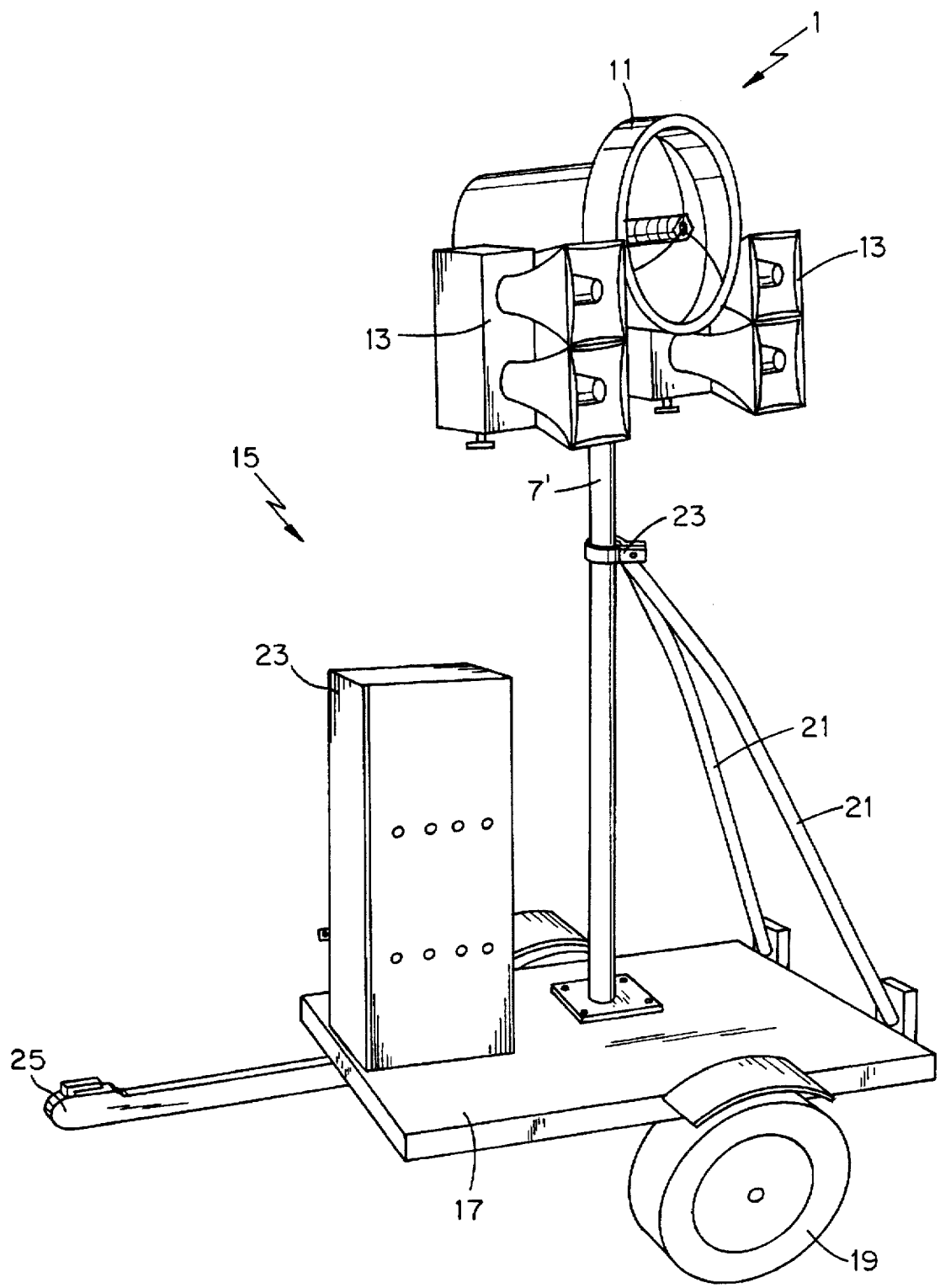
FIG. 2 is an orthogonal view of the integrated searchlight and speaker unit, in accord with the present invention, mounted on a trailer.

FIG. 2 depicts an alternate mobile implementation using a trailer mounted support structure. In the illustrated example, the trailer 15 has a simple flat bed 17 mounted on one axle having two wheels 19. The flat bed 17 supports a post 7', similar to the center post in the quadropod structure of FIG. 1. The support structure shown in FIG. 2 also includes two braces 21 connected from a bracket 23 near the top of the post 7' to points near the back corners of the trailer bed 17. The tube on the integrated searchlight and loudspeaker unit 1 fits over the top of the post 7', to mount the unit 1 in the manner discussed above relative to FIG. 1.

In the implementation of FIG. 2, the trailer bed 17 also carries a cabinet 23 housing the power junction box and amplifier for the audio-illuminator system, as discussed more below with regard to the circuit diagram of FIG. 4. The cabinet 23 will also provide storage for at least the cabling and the remote control. Although not shown for simplicity, the trailer 15 also will typically carry a small, diesel powered generator. The trailer includes an integral trailer hitch 25, for coupling to a towing vehicle.

Figure 3:
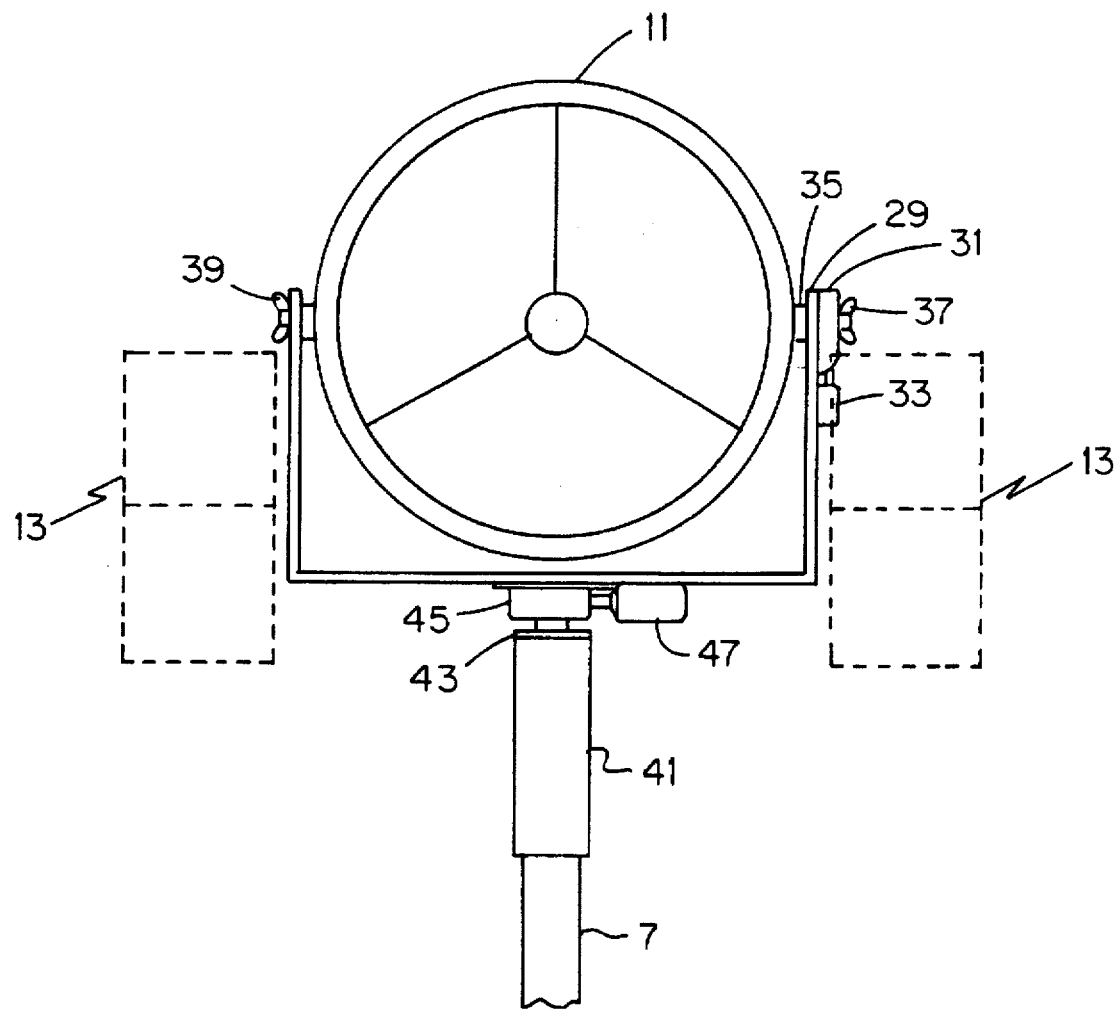
FIG. 3 is an front view of the integrated searchlight and speaker unit of the present invention, illustrating details of the mounting thereof for motorized movement of the searchlight and speakers.

The front view of FIG. 3 illustrates the gimbal mounting and the support structure for the searchlight and loudspeakers. The searchlight 11 is supported for tilt movement within a U-shaped bracket 29, and the U-shaped bracket 29 is supported for horizontal rotation about a vertical axis. As shown in dotted line in FIG. 3, the bracket 29 also supports the loudspeakers 13. As such, the movement of the bracket permits unified pan control of the aiming of both the searchlight 11 and the loudspeakers 13.

Consider first the tilt-control and mounting of the searchlight 11 within the U-shaped bracket 29.

One of the vertical extensions of the U-shaped bracket 19 supports a gimbal mechanism 31. A motor 33 drives the gears (not visible) of the gimbal 31. The gimbal 31 includes a square protrusion that rotates in response to the rotation of the gears by the motor 33. The protrusion extends through an opening in the U-shaped bracket 29. A socket in a boss 35 on the side of the searchlight 11 mates with the square protrusion from the gimbal 31. A wing-bolt or lag-bolt 37 extends through the gimbal 31, including through the square protrusion. The bolt 37 also extends through an opening through the boss 35 and screws into threads formed in the searchlight housing. As the bolt 37 is tightened, it is draws the protrusion of the gimbal 31 into tight engagement in the socket in the boss 35.

A second lag bolt 39 extends through the other vertical extension of the bracket 29 and screws into threads in the housing of the searchlight 11. The lag bolt 39 pivots in the opening through the bracket 29 and provides a pivot point for tilt movement of the searchlight 11 relative to the bracket 29. The threaded openings in the housing of the searchlight 11, the opening through the bracket 29 and the location of the gimbal 31 in the bracket 29 define a horizontal axis through the searchlight 11. Preferably, the searchlight is balanced about this horizontal axis.

Activation of the motor 33 causes rotation of the vertical gear within the gimbal 31. As that gear moves, the square protrusion from the gimbal rotates about its axis. The square protrusion of the gimbal 31 engages the square socket in the boss 35, therefore, the rotational motion of the protrusion causes the searchlight 11 to pivot about the horizontal axis. The pivotal motion causes the searchlight to tilt up or down, depending on the direction of motor rotation, to provide vertical aiming of the searchlight beam. When drive current is withdrawn from the motor 33, the motor stops; and the motor 33 and gimbal 31 hold the searchlight 11 in position, at a particular tilt angle.

Consider now the pan-control and mounting of the bracket 29 supporting the searchlight 11 and the loudspeakers 13. When installed, a sleeve or tube 41 provides a female coupling over the top (male) of the post 7 (or 7') of the support structure, for mounting purposes discussed above. A pin (not shown) may slide through the tube 41 and the post 7, to prevent rotation of the tube relative to the post. A gimbal support surface plate 43 is attached to the top of the tube 41, and the plate 43 is attached to a rotational shaft of the gimbal 45. The gimbal 45, in turn attaches to the center of the lower or horizontal portion of the U-shaped bracket 29.

A gimbal motor 47 causes rotation of the gimbal 45 about the shaft. As a result, the gimbal and the attached bracket 29 rotate about the vertical axis of the shaft. This causes the searchlight 11 and loudspeakers 13 to rotate in a horizontal direction, about the vertical axis. This motion permits horizontal aiming of both the searchlight 11 and the loudspeakers 13.

In the illustrated embodiment, the audio-illuminator includes four loudspeakers 13, shown in dotted line form in FIG. 3. The loudspeakers 13 are attached to the U-shaped bracket 29, by any convenient one of several means. For example, the drivers of each pair of loudspeaker may fit into a surrounding cabinet or housing structure. Each such cabinet or housing structure then bolts to one of the vertical extensions of the U-shaped bracket of FIG. 3. Alternatively, the U-shaped bracket may be modified to have additional extensions, extending down or extending out horizontally, to connect to and support the loudspeaker drivers.

Although not shown, one or more loudspeakers may be attached directly to the housing of the searchlight 11, for example at the top. This mounting has the added advantage that tilting of the searchlight tilts the loudspeaker, i.e. providing two degrees of freedom of motion (pan and tilt) in aiming the loudspeaker(s) and the searchlight.

Figure 4:
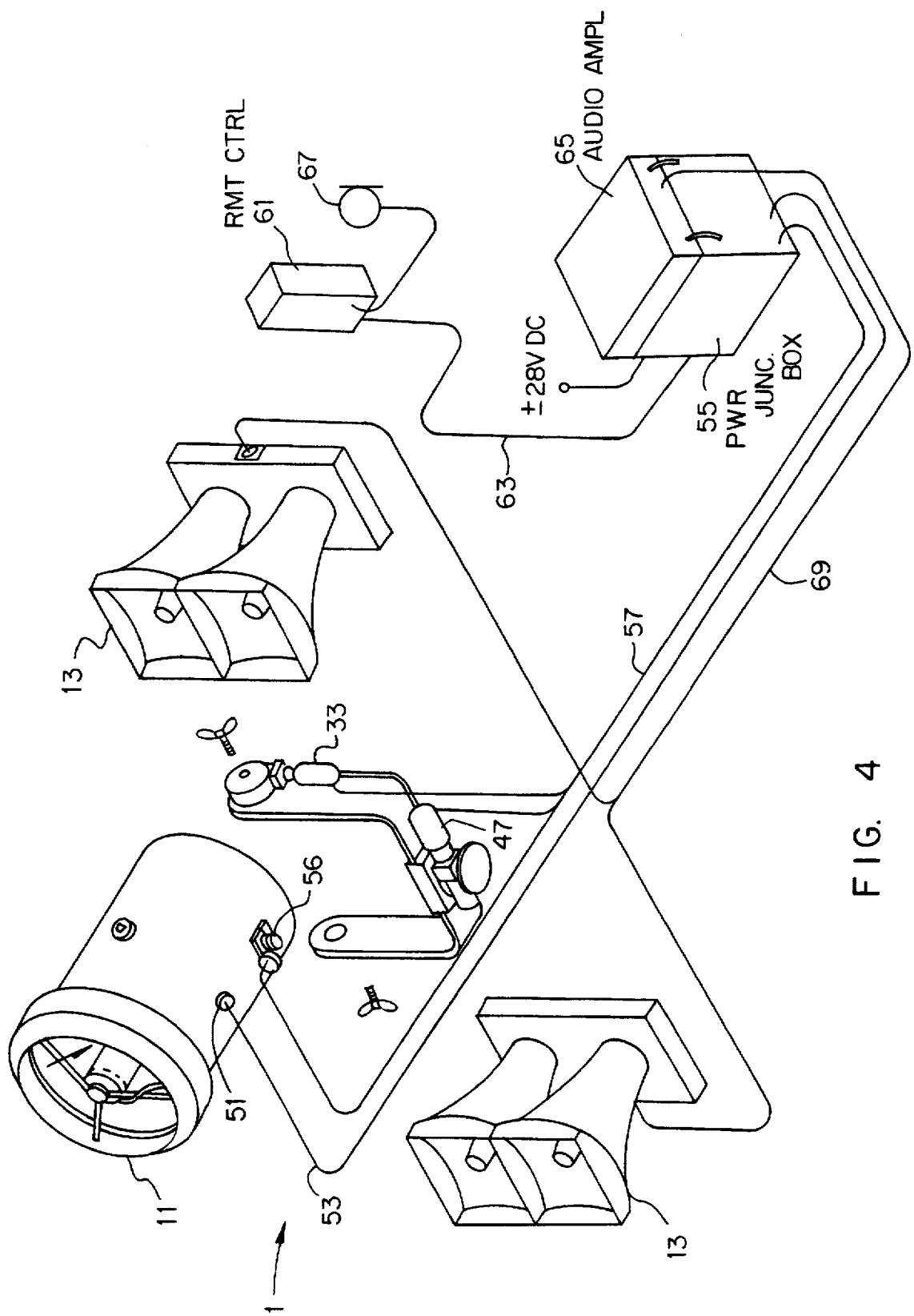
FIG. 4 is an exploded view of the integrated searchlight and speaker unit and a functional block diagram of the power, control and audio components of the audio-illuminator system, illustrating the electrical interconnection thereof.

FIG. 4 shows the various elements of the audio-illuminator system. More specifically, FIG. 4 shows the separated elements of the integrated searchlight and speaker unit 1 and the electrical connections to the various other elements of the audio-illuminator system. As shown, the searchlight 11 includes an electrical power terminal 51. The terminal 51 connects to a power cable 53 running from a power junction box 55.

In the presently preferred embodiment, the power and junction box 55 receives 28 VDC from an appropriate source (not shown). Any convenient power source may serve this purpose. For example, a portable diesel generator may supply AC power, and an associated power supply circuit would convert the AC power to the necessary 28 VDC power. Alternatively, the junction box 55 may connect to one or a series of batteries.

The power junction box 55 supplies power to the searchlight 11 and to an audio amplifier 65. An operator activates on-off control of the power supplied to both the searchlight 11 and the audio amplifier 65 by activating one or more switches on the remote control 61.

As noted above, the focus of the searchlight 11 is adjustable. This facilitates operation over different distances. Using the Spectrolab searchlight mentioned above, this control permits adjustment of the beam dispersion angle between 1 and 10 degrees. As a result, the searchlight is effective at ranges of 1–4 kilometers. As shown in FIG. 4, the searchlight 11 includes a motor 56 for driving the focus adjustment, e.g. to move the directional reflector or mirror within the searchlight. This motor 56 receives a control signal from one or more leads of a control cable 57 running from the junction box 55. The gimbal motors 33 and 47 discussed above, also receive control signals via leads of the multi-conductor cable 57.

In a preferred embodiment, the motors 33, 47 and 55 are DC motors. Application of a DC voltage of a positive polarity causes rotation thereof in a first direction, and application of a DC voltage of a negative polarity causes rotation thereof in the opposite direction. The leads from the control cable 57 carry the necessary DC voltages from the junction box 55. The junction box 55 outputs these DC voltages onto the appropriate leads of the cable 57, when corresponding switches are activated on the remote control 61.

Figure 5:
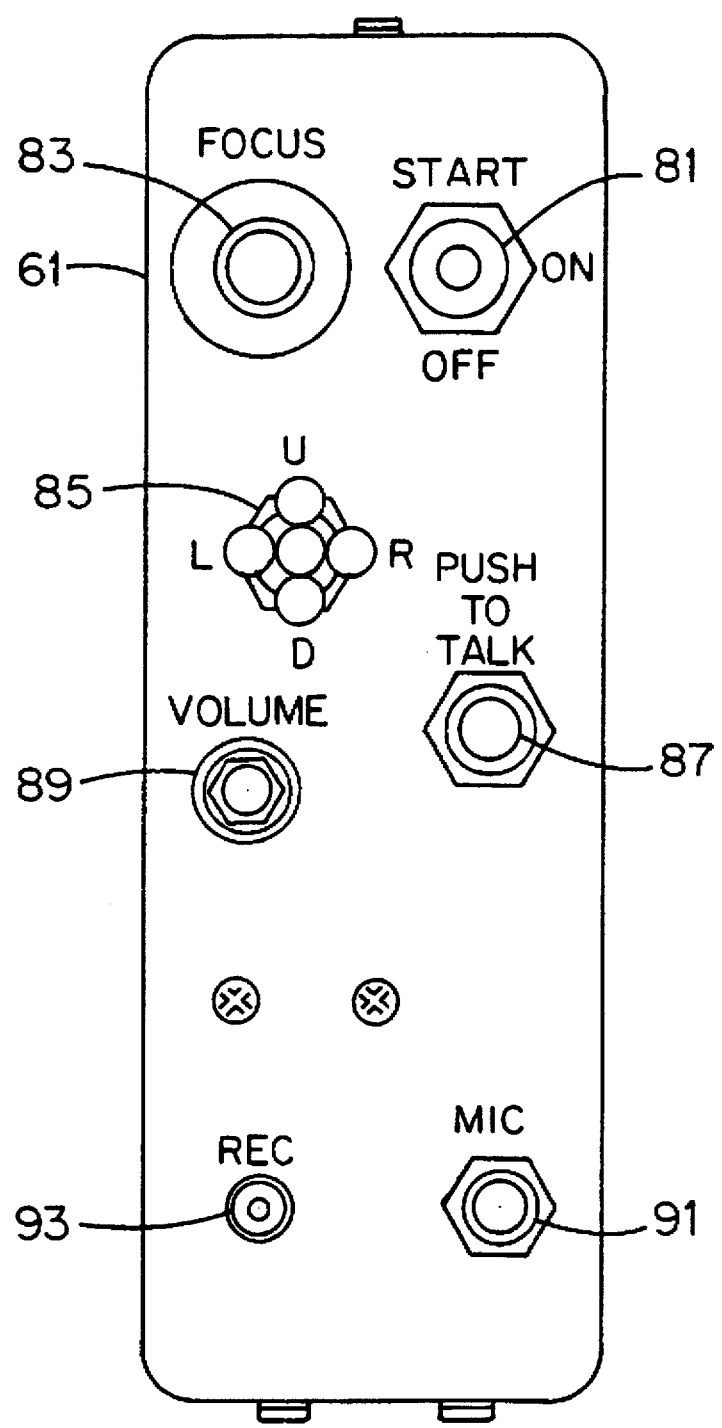
FIG. 5 is a front view of the remote control used in the preferred embodiment of the audio-illuminator system.

As shown in FIG. 5, the remote control 61 includes a pushbutton switch 81 for on-off power control of the searchlight 11 and the audio amplifier 65. A focus control toggle switch 83 selectively applies positive or negative DC voltage, in response to user activation, to drive the focusing motor 56. The remote control 61 also includes a five position (home, right, left, up and down) joystick 85 for activating the control voltages to drive the gimbal motors 33 and 47.

In the illustrated embodiment (FIG. 4), the remote control connects to the power and junction box 55 via a multi-conductor cable 63. The cable 63 carries power to elements in the remote control 61. The cable 63 carries control signals from input devices (switches, poteniometers, etc.) on the remote control 61 to the junction box 55.

The cable 63 also carries audio input signals to the amplifier 65, such as the signal from microphone 67. Cables 69 carry amplified audio signals from the audio amplifier 65 to the individual loudspeakers 13 in the two arrays.

In an embodiment using the four loudspeakers 13, the audio amplifier 65 may be rated at 250 Watts output power. The amplified audio output from four directional loudspeakers 13 has an effective range of 1–2 kilometers. Longer ranges are practical using more loudspeakers and amplification.

For the control of the audio portion of the system, the remote control 61 includes a 'push-to-talk' switch 87 and a volume control potentiometer 89 (see FIG. 5). The remote control 61 also includes one or more connections for audio inputs. In the illustrated embodiment, the remote control 61 includes two female electrical connectors or sockets 91 and 93, of different sizes. The socket 91 receives a male plug from the microphone 67 (e.g. a 150 Ohm input). The microphone 67 may be a handheld microphone, a headset microphone, a lavaliere microphone or the like, easily held or worn by the system operator. The socket 93 receives a male plug from any desired alternate audio source, such as a tape recorder output (e.g. a 1000 Ohm input).

Although not shown in FIG. 5, the remote control preferably includes a clip on the back for securing the remote control to a belt or pocket. The remote control may also include a handle. In the illustrated embodiment, the remote control provides a connection to an external microphone. Alternatively, the remote control may include a built-in microphone.

Now consider deployment and operation of the illustrated preferred embodiment (FIGS. 3, 4 and 5).

The enforcement officer or other operator sets up the support structure and installs the integrated searchlight and loudspeaker unit 1 on top of the post 7 or 7', as discussed above. The operator connects the power cable 53 from the junction box 55 to the power terminal 51 of the searchlight 11 and connects the junction box 55 to the power source. The operator connects the control signal cable 57 from the junction box 55 to the various motors 33, 47 and 56. The operator also connects the cable 69 from the audio amplifier 65 to the terminals of the loudspeakers 13.

The cables 53, 57 and 69 permit some separation between the location of the integrated searchlight and speaker unit 1 and the location of the junction box 55 and amplifier 65. The operator also connects the cable 63 between the remote control 61 and the junction box 55. The cable 63 permits separation between the location of the officer operating the remote control 61 and the location of the junction box 55 and amplifier 65. Even using cables as shown, the officer may be 30–50 yards away from the actual location of the integrated searchlight and speaker unit 1.

If a separate microphone is used, such as microphone 67, the operator connects the cable from the microphone 67 to the connector 91 on the face of the remote control 61. To begin operation from the remote location, the enforcement officer or other operator activates switch 81 to turn on the power to the amplifier 65 and the searchlight 11.

The operator can push the focus switch 83 up or down, causing application of the appropriate voltage to the motor 56. In response, the motor 56 moves the reflector of the searchlight 11 backward or forward to produce a corresponding change in the focus of the searchlight beam.

The operator can push the joystick 85 left or right to control panning motion of the searchlight 11 and the loudspeakers 13. Such actuation causes application of the appropriate DC voltage to the gimbal drive motor 47. In response, the gimbal 45 and the attached bracket 29 rotate about the vertical axis, in a direction dictated by the polarity of the control signal and corresponding to the left or right direction of activation of the joystick 85. This causes the searchlight 11 and loudspeakers 13 to rotate left or right in a horizontal direction. The searchlight beam pans left or right, and the directional audio output by the loudspeakers pans left or right. When the operator releases the joystick 85, the joystick returns to its rest position, and current to the motor 47 is interrupted. The motor stops, stopping rotation of the gimbal 45. The searchlight 11 and speakers 13 provide directed outputs in the aiming direction selected when the operator released the joystick unless and until the operator again actuates the joystick 85 to the left or right.

The operator also can push the joystick 85 up or down to control tilting motion of the searchlight 11. Such actuation causes application of the appropriate DC voltage to the gimbal drive motor 33. In response, the protrusion from the gimbal 31 rotates about the horizontal axis, in a direction dictated by the polarity of the control signal and corresponding to the up or down direction of activation of the joystick 85. This causes the searchlight 11 and the beam emitted from the searchlight to tilt up or down in a vertical direction. The searchlight 11 will stop and remain in its current position when the operator releases the joystick interrupting current to the drive motor 33, unless and until the operator again actuates the joystick 85 up or down.

Thus, activation of the joystick 85 allows the enforcement officer to control pan and tilt aiming of the beam from the searchlight 11, from a convenient location at a safe distance from the actual searchlight location. The same activation of the joystick 85 allows the enforcement officer to control horizontal aiming (pan) of the loudspeakers 13.

To provide an audio output, the enforcement officer or other operator activates the push-to-talk switch 87 on the remote control 61. This couples any audio input from the connectors 91 and 93 to the audio amplifier 65. In the present example, using the microphone 67, activation of the push-button switch 87 couples the audio signal from the microphone 67 to the amplifier 65. The amplifier 65 generates a high-power audio output signal at an appropriate level to drive the loudspeakers 13. The operator can adjust the level of this signal by operating the volume control potentiometer 89. Thus, the enforcement officer can provide audio input and control the audio functions of the integrated unit 1 from the safe, remote location.

The implementations of the invention illustrated in the drawings are preferred embodiments. Persons skilled in the art will recognize that the invention is subject to a variety of modifications, particularly as appropriate to facilitate particular applications of the invention. For example, the illustrated embodiments have two speaker arrays, one on each side of the searchlight; and each speaker array comprises two loudspeakers. The apparatus may include as few as one loudspeaker, or the apparatus may include larger numbers of loudspeakers, e.g. four in each array. Also, the invention may utilize a range of different bracket and support structures and/or different drive mechanisms to facilitate the motion of the searchlight and loudspeakers. For example, the speakers may be mounted with the searchlight to move in both directions with the searchlight (tilt as well as pan).

The audio-illuminator system may also incorporate other components. For example, the system may include a sound effects generator chip, e.g. to generate a number of different types of siren sounds. In one embodiment, the sound effects chip could be an element in the remote control. The remote control would include a switch to activate the sound effects chip and a selector, to select from several standard sounds that the chip is capable of generating.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. An apparatus comprising:

a searchlight;

a bracket supporting the searchlight in such a manner as to permit motion of the searchlight in a first direction;

a first motorized mechanism for automatically moving the searchlight in the first direction in response to a first control signal;

at least one loudspeaker supported by the bracket;

a support structure supporting the bracket in such a manner as to permit motion of the bracket, searchlight and at least one loudspeaker in a second direction orthogonal to the first direction; and a second motorized mechanism for automatically moving the bracket and searchlight in the second direction in response to a second control signal.

2. An apparatus as in claim 1, wherein the first motorized mechanism comprises:

a gimbal attached to the bracket and coupled to the searchlight; and a motor coupled to drive the gimbal.

3. An apparatus as in claim 1, wherein the second motorized mechanism comprises:

a gimbal attached to the bracket and coupled to the support structure; and a motor coupled to drive the gimbal.

4. An apparatus as in claim 1, wherein the at least one loudspeaker comprises an array of two or more directional loudspeakers attached to the bracket.

5. An apparatus as in claim 4, further comprising another array of two or more directional loudspeakers attached to the bracket.

6. An apparatus as in claim 1, wherein the support structure comprises a coupling for connection to a post.

7. An apparatus as in claim 6, wherein the support structure further comprises:

a trailer adapted for towing by a vehicle; and a post mounted on the trailer.

8. An apparatus as in claim 1, wherein the support structure comprises a collapsible pedestal having a plurality of legs.

9. An apparatus as in claim 8, wherein the pedestal is a quadropod.

10. An apparatus as in claim 1, further comprising an integrated remote control, for providing the first and second control signals in response to operator activation and providing an audio input signal, from a remote location.

11. An audio and illumination system, comprising:

an integrated light and speaker unit comprising:

(a) a searchlight, (b) a bracket mounted for horizontal rotation about a substantially vertical axis and supporting the searchlight for pivotal tilt motion about a substantially horizontal axis, (c) at least one loudspeaker supported by the bracket for at least rotational motion together with the bracket, (d) a first motorized mechanism coupled to the searchlight for automatically tilting the searchlight with respect to the bracket, in response to a first control signal, and (e) a second motorized mechanism for automatically rotating the bracket about the substantially vertical axis, in response to a second control signal; and a remote control, coupled for communication with the integrated light and speaker unit from a location remote from the integrated light and speaker unit, for providing the first and second control signals in response to operator activation and for providing an audio input signal.

12. An audio and illumination system as in claim 11, further comprising an amplifier, a junction box, cables connecting the amplifier and junction box to the integrated light and speaker unit, and a cable connecting the remote control to the junction box.

13. An audio and illumination system as in claim 11, wherein each of the motorized mechanisms comprises a gimbal and a motor coupled to drive the gimbal.

14. An audio and illumination system as in claim 11, further comprising an automatic mechanism for adjusting focus of the searchlight in response to a third control signal, wherein the remote control supplies the third control signal in response to operator activation.

15. An audio and illumination system as in claim 11, wherein the at least one loudspeaker comprises an array of loudspeakers.

16. An audio and illumination system, as in claim 11, wherein the integrated light and speaker unit is portable.

17. An audio and illumination system, comprising:

a searchlight mounted for movement in two orthogonal directions;

a first automatic drive mechanism for moving the searchlight in a first one of the directions in response to a first control signal;

a second automatic drive mechanism for moving the searchlight in a second one of the directions in response to a second control signal;

a loudspeaker mounted for movement with the searchlight in at least one of the two orthogonal directions; and a remote control for providing the first and second control signals from a remote location in response to operator activation and for providing an audio input signal for audible output from the loudspeaker.

18. An audio and illumination system as in claim 17, further comprising an audio amplifier providing audio signals to drive the loudspeaker, wherein the remote control controls operation of the audio amplifier and supplies audio input signals to the audio amplifier.

19. An audio and illumination system as in claim 17, further comprising an automatic mechanism for adjusting focus of the searchlight in response to a third control signal, wherein the remote control supplies the third control signal in response to operator activation.

20. An audio and illumination system as in claim 17, wherein the at least one loudspeaker comprises an array of directional loudspeakers.

* * * * *